April 17, 1962 M. SCHWARZ 3,030,561
TRANSISTORS AND METHOD OF MAKING
Filed July 1, 1960
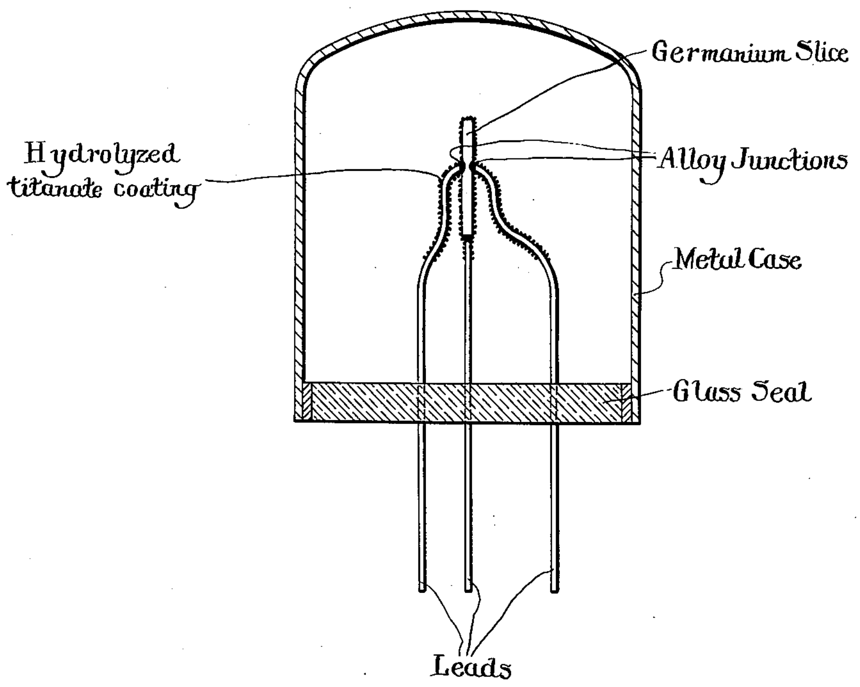
INVENTOR
Meyer Schwarz
BY Connolly and Hutz
ATTORNEYS United States Patent Office 3,030,561
Patented Apr. 17, 1962

3,030,561
TRANSISTORS AND METHOD OF MAKING
Meyer Schwarz, Kensington, Md., assignor to Sprague Electric Company, North Adams, Mass., a corporation of Massachusetts
Filed July 1, 1960, Ser. No. 40,366
4 Claims. (Cl. 317—235)

This invention relates to the fabrication of semiconductor signal translating devices and, more particularly, to a method of treating the surface of transistors to improve the electrical characteristics thereof, and to such improved devices. It is well known in the art that many of the transistors, as they are known today, suffer from the fact that they have low current amplification (Beta), while their $I_{CO}$ (collector current) is rather high. The reason for this behavior is not too well understood and is usually ascribed to the instability of the surface of the transistor devices.

The present application is in part a continuation of prior application Serial No. 859,861, filed December 16, 1959, and now abandoned.

The object of the present invention is to provide transistors in which these disadvantages are minimized so that they have improved electrical characteristics.

Another object of the present invention is to provide a method of improving transistors. The above as well as additional objects of the present invention will be more clearly understood from the following description, reference being made to the figure of the appended drawing which shows an improved transistor embodying the invention.

The method of the present invention comprises the application to the germanium or silicon surface of a germanium or silicon transistor, of a liquid hydrolyzable titanate ester of an alcohol which ester on hydrolysis is converted to a titanium oxide, hydrolyzing the applied ester to cause said conversion and form said titanium oxide in situ on the germanium or silicon surface, and then drying the resulting product.

The hydrolyzable titanate esters have the structural formula $(RO)_4Ti$, wherein R is an alkyl, aryl, alkaryl or aralkyl group. Alkyl groups having up to 10 carbon atoms are preferred and of these the alkyl groups having less than 6 carbon atoms hydrolyze most readily. Typical R groups are n-butyl, isobutyl, tertiary butyl, ethyl, n-propyl, isopropyl, n-amyl and its isomers, n-hexyl, phenyl, etc. The four R groups in the titanate molecule can be identical or they can be combinations of two, three or four members of the above-named groups.

The hydrolysis of the present invention is carried out by contacting the titanate ester, after it is on the germanium surface, with water either in gaseous or liquid form. The result of the hydrolysis is an in situ formed adherent titanium oxide of complex structure generally considered to be polymeric.

The following is an example of the present invention:

*Example*

A germanium PNP transistor of the junction type was made from an appropriately doped slice of germanium five mils thick, twenty-five mils wide, and fifty mils long with the two junctions produced by diffusion so as to be approximately three mils apart and having three leads soldered in place to the respective N and P zones. The leads were all dressed to extend in a close parallel grouping, and held by these leads, the transistor was immersed in a body of tetra-n-butyl titanate at room temperature so that the entire germanium body was immersed about 1/8 inch below the level of the titanate. The transistor was promptly withdrawn from the liquid and clamped by its leads in a humidity box having a body of water at room temperature and kept at 96% relative humidity by a fan. After 16 hours the hydrolysis caused by the ambient humidity in the box was complete and the transistor was then unclamped, withdrawn and placed in a 65° C. air oven. The hydrolysis had converted the liquid coating on the transistor to a white powdery adherent material which completely covered the germanium surface and extended up the three leads for a short distance. After four hours in the oven the transistor was placed in a desiccator where it was held for one hour over phosphoric anhydride. The transistor was then hermetically sealed in a metal can having one open end soldered to a metal rimmed compression glass seal having three feed-through connectors. The transistor leads were cut short and welded to the feed-through leads before the can was soldered in place.

The following table, where Beta is the amplification factor and $I_{CO}$ is the leakage current in microamperes between the collector and the base of the transistors, shows the immediate as well as the prolonged effects of the above treatment:

| Unit | Before Treatment | | After Treatment | | 6 Weeks After Treatment | |
|---|---|---|---|---|---|---|
| | Beta | Ico | Beta | Ico | Beta | Ico |
| 1 | 210 | 2.2 | 350 | 1.8 | 360 | 1.2 |
| 2 | 170 | 2.0 | 295 | 1.5 | 280 | 1.5 |
| 3 | 195 | 3.0 | 400 | 1.5 | 350 | 1.5 |
| 4 | 105 | 2.0 | 200 | 1.0 | 160 | 1.0 |
| 5 | 260 | 2.4 | 500 | 1.5 | 500 | 1.0 |

It will be seen from the above table that the Beta increases considerably after treatment, while there is a decrease in $I_{CO}$, and that both changes persist. It is therefore seen that good stability as well as enhanced electrical characteristics are obtained through this treatment of transistors.

Similar results are obtained with the other titanates and with NPN junction germanium or silicon transistors as well as point contact germanium or silicon transistors of all types, tetrode germanium or silicon transistors, field effect germanium or silicon transistors and the like.

Instead of having the titanate ester in undiluted form, it can be diluted with a solvent such as a volatile hydrocarbon, alcohol or ether such as benzol, ethanol, chloroform and other such liquids that have up to 10 carbon atoms per molecule. As little as 10% titanate ester can be present in such diluted compositions, and still obtain improvements of the above type. Titanium oxide coating weights produced by the present invention are about 5 micrograms per square millimeter of surface, and when the titanate film is too thin to produce such a final deposit, repeated applications and hydrolysis should be effected to produce best results. The titanate film thickness is controlled by changing the temperature and concentration of the coating liquid.

Hydrolysis can also be accomplished by spraying hydrolyzing liquids onto the dipped transistor. Gentle sprays produced by low pressure atomizers are preferred in order to keep from blowing away the titanate film, and the spray is best arranged to form a mist of atomized droplets that diffuses towards the transistor.

The drying of the hydrolyzed coating can be carried out in any desired way as by simple evacuation, with or without heat, or by blowing warm dry air over the transistor.

Obviously many modifications and variations of the present invention are possible in the light of the above teachings. It is, therefore, to be understood that within the scope of the appended claims the invention may be practiced otherwise than as specifically described.

What is claimed:

1. In the manufacture of transistors, the step of improving the transistor characteristics by applying to the surface of the transistor a liquid hydrolyzable titanate ester of an alcohol which ester on hydrolysis is converted to a titanium oxide, hydrolyzing the applied ester to cause said conversion and form said titanium oxide in situ on the germanium surface, and then drying the resulting product.

2. In the manufacture of germanium transistors, the step of improving the transistor characteristics by applying tetra-n-butyl titanate to the germanium surface of the transistor, hydrolyzing the applied titanate by exposing it to high humidity to cause the titanate to form a titanium oxide in situ on the germanium surface, drying the resulting product, and then hermetically sealing it.

3. A germanium transistor having its germanium surface covered with a thin adherent film of a complex structure consisting essentially of units having the formula $(RO)_4Ti$ where R is selected from the group consisting of alkyl with from one to ten carbon atoms, aryl, alkaryl, aralkyl, a titanium oxide formed in situ by hydrolysis of a titanate ester.

4. A hermetically sealed germanium transistor having its germanium surface covered with a thin adherent film of a complex structure consisting essentially of units having the formula $(RO)_4Ti$ where R is selected from the group consisting of alkyl with from one to ten carbon atoms, aryl, alkaryl, aralkyl, a titanium oxide formed in situ by hydrolysis of a titanate ester.

References Cited in the file of this patent

UNITED STATES PATENTS

| | | |
|---|---|---|
| 2,830,920 | Colson et al. | Apr. 15, 1958 |
| 2,843,809 | Varela | July 15, 1958 |